(12) United States Patent
Saku et al.

(10) Patent No.: US 7,896,290 B2
(45) Date of Patent: Mar. 1, 2011

(54) LATCH DEVICE OF COCKPIT DOOR OF AN AIRCRAFT

(75) Inventors: Fumiaki Saku, Tokyo (JP); Tadashi Watanabe, Tokyo (JP); Yasuo Sekikawa, Tokyo (JP)

(73) Assignee: Jamco Corporation, Tokyo (JP)

( * ) Notice: Subject to any disclaimer, the term of this patent is extended or adjusted under 35 U.S.C. 154(b) by 737 days.

(21) Appl. No.: 11/905,519

(22) Filed: Oct. 2, 2007

(65) Prior Publication Data

US 2008/0111025 A1    May 15, 2008

(30) Foreign Application Priority Data

Nov. 13, 2006    (JP) .............................. 2006-306207

(51) Int. Cl.
*B64C 1/14*    (2006.01)
(52) U.S. Cl. .................................................. 244/129.5
(58) Field of Classification Search ........................ None
See application file for complete search history.

(56) References Cited

U.S. PATENT DOCUMENTS

| | | | | |
|---|---|---|---|---|
| 4,681,286 | A * | 7/1987 | Church et al. | 244/129.5 |
| 6,669,144 | B2 * | 12/2003 | Artsiely | 244/129.5 |
| 6,866,227 | B2 * | 3/2005 | Pratt et al. | 244/129.4 |
| 6,902,137 | B2 * | 6/2005 | Brzeski et al. | 244/129.5 |
| 6,945,497 | B2 * | 9/2005 | Saku et al. | 244/129.5 |
| 7,578,475 | B2 * | 8/2009 | Pratt et al. | 244/129.4 |

FOREIGN PATENT DOCUMENTS

| JP | 07-305551 A | 11/1995 |
|---|---|---|
| JP | 2003-261098 A | 9/2003 |
| JP | 2005-104428 A | 4/2005 |

OTHER PUBLICATIONS

Japanese Office Action dated Sep. 9, 2008, issued in corresponding Japanese Patent Application No. 2006-306207.

* cited by examiner

*Primary Examiner*—Tien Dinh
(74) *Attorney, Agent, or Firm*—Westerman, Hattori, Daniels & Adrian, LLP

(57) ABSTRACT

A latch device for detecting pressure reduction of a cockpit in an aircraft and releasing a bolt and a stopper device are provided so as to prevent a cockpit door from unexpectedly opening by an impact. A main latch device 100 of the cockpit door has a frame 112 fixed to a door panel, and a latch base 120 is mounted to the frame 112 capable of pivotal rotation with a pin 122 as a fulcrum. A bolt 132 is inserted into a catch in conjunction with a door handle 130. A holding/releasing portion 150 holds the latch base 120. When a pressure difference occurs between a cockpit 4 and a cabin 5, a pressure-sensing piston 160 is pushed in, a trigger 170 and a flapper 180 are rotated and the latch base 120 is released. A stopper device 190 regulates movement of the trigger 170 by movement of an inertial piston 192 when an impact force is applied from the cabin 5 side.

4 Claims, 11 Drawing Sheets

The present application is based on and claims priority of Japanese patent application No. 2006-306207 filed on Nov. 13, 2006, the entire contents of which are hereby incorporated by reference.

LATCH DEVICE OF COCKPIT DOOR OF AN AIRCRAFT

BACKGROUND OF THE INVENTION

1. Field of the Invention

The present invention relates to a latch device used for a cockpit door or the like provided between a cabin and a cockpit of an aircraft.

2. Description of the Related Art

FIG. 1 illustrates an outline of a cockpit door, and a cockpit door 1 is required to be held closed during flight and also to be unable to be easily opened/closed for a security reason. For this purpose, an electronic mechanism or the like is used so that a latch device 2 is electrically released by typing a password on a keypad 3.

In an aircraft, the inside is pressurized during flight and adjusted to an internal pressure higher than the atmospheric pressure.

However, if the pressure is reduced on a cockpit 4 side due to some reasons, a differential pressure is generated with respect to the pressure on a cabin 5 side. In order to let this differential pressure go, there is a need to reduce the pressure of the cabin 5 by opening the cockpit door 1 toward the cockpit 4 side.

The Japanese Patent Laid-Open Publication No. 2003-261098 relates to a latch device of a cockpit door of an aircraft proposed by the present applicant.

The latch device of the cockpit door of an aircraft comprises a handle provided on the cockpit side of a door panel, a handle unit having a bolt releasably engaged with a catch provided at a door frame by operation of the handle, and a bolt releasing mechanism for forcedly releasing the bolt from the catch upon detection of an air pressure inside a cabin when the air-pressure in a cockpit drops.

However, in the above latch device of the cockpit door of an aircraft, if some impact is applied to the cockpit door 1 from the cabin 5 side, a piston member of the bolt releasing mechanism is moved by inertia, and though there is no differential pressure generated, the bolt is unexpectedly released from the catch and the cockpit door 1 might be opened toward the cockpit 4 side.

An object of the present invention is to provide a latch device of a cockpit door of an aircraft which solves the above problem.

SUMMARY OF THE INVENTION

In order to achieve the above object, a latch device of a hinge-type cockpit door provided between a cabin and a cockpit of an aircraft and opened toward the cockpit side according to the present invention comprises a housing fixed to a door body, a base mounted to the housing capable of pivotal rotation with respect to the housing having the vicinity of an end on a catch side of the housing as a fulcrum, a handle rotatably mounted to the base, a bolt interlocking with the handle, a flapper mounted to the housing and detachably engaged with the end on the side opposite to the base fulcrum, a trigger detachably engaged with the flapper, a cylinder provided at the housing, a pressure-sensing piston inserted into the cylinder, and a holding/releasing mechanism for disengaging a stopper base by operation of the pressure-sensing piston moved when the air pressure in the cockpit is lowered, in which the holding/releasing mechanism is provided with a stopper device for regulating movement of the trigger when an impact force is applied to the door body.

And the stopper device is provided with an inertia piston which precedingly advances into a track of the trigger upon receipt of an inertia force by the impact force applied to the door body.

Moreover, in the latch device of the hinge-type cockpit door provided between the cabin and the cockpit of an aircraft and opened toward the cockpit side according to the present invention, the door body is provided with an escape door opened toward the cabin side and a latch device for holding the escape door, and the latch device comprises a housing fixed to the door body, a cylinder provided at the housing, a pressure-sensing piston inserted into the cylinder, a trigger interlocking with the pressure-sensing piston, a flapper detachably engaged with the trigger, and a catch of a latch interlocking with the flapper, and a holding/releasing mechanism for releasing the catch by the operation of the pressure-sensing piston moved when the air pressure of the cabin is lowered is provided. And the holding/releasing mechanism is provided with a stopper device for regulating movement of the trigger when an impact force is applied to the door body.

And the stopper device is provided with an arm which precedingly advances into a track of the trigger upon receipt of an inertia force by the impact force applied to the door body.

The latch device of the cockpit door of an aircraft according to the present invention provided with the above means can have a function to release the door by sensing pressure reduction, hold the door against the impact force and improve safety.

DETAILED DESCRIPTION OF THE PREFERRED EMBODIMENTS

Figure 1:
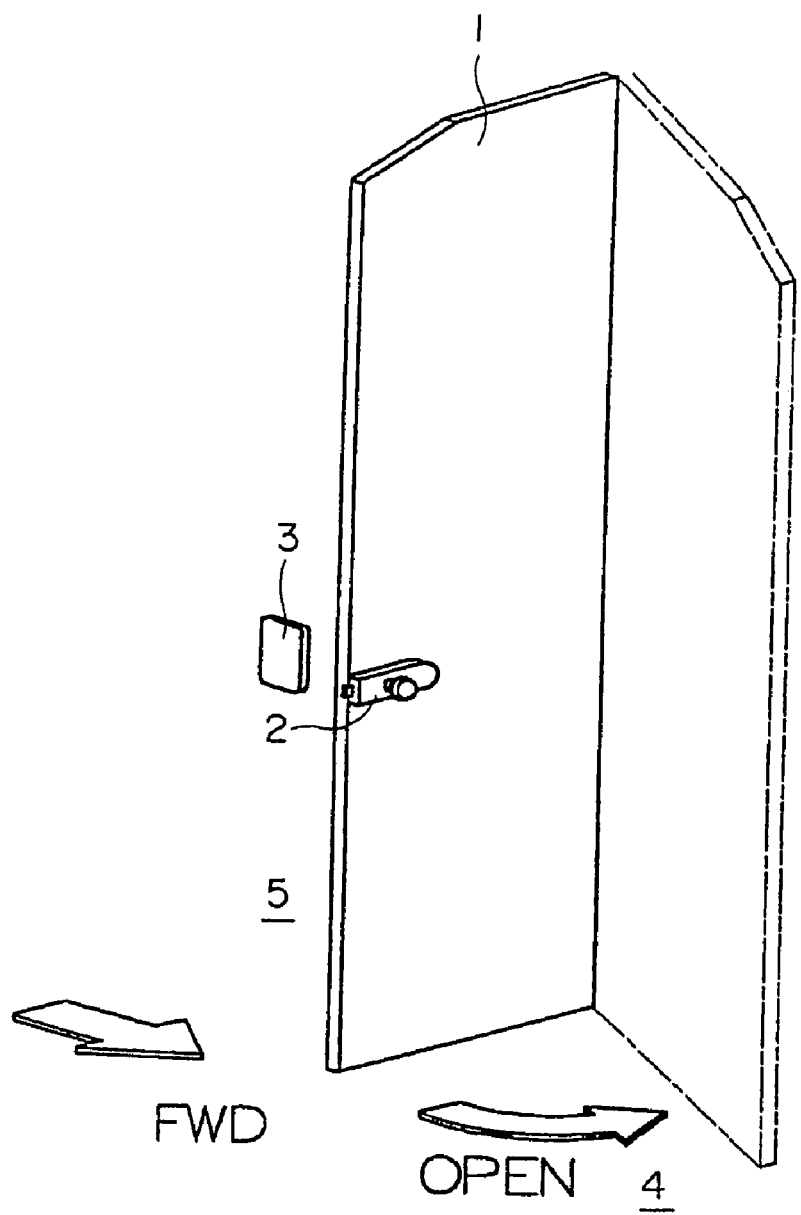
FIG. 1 is an explanatory view illustrating an outline of a cockpit door.
Figure 2:
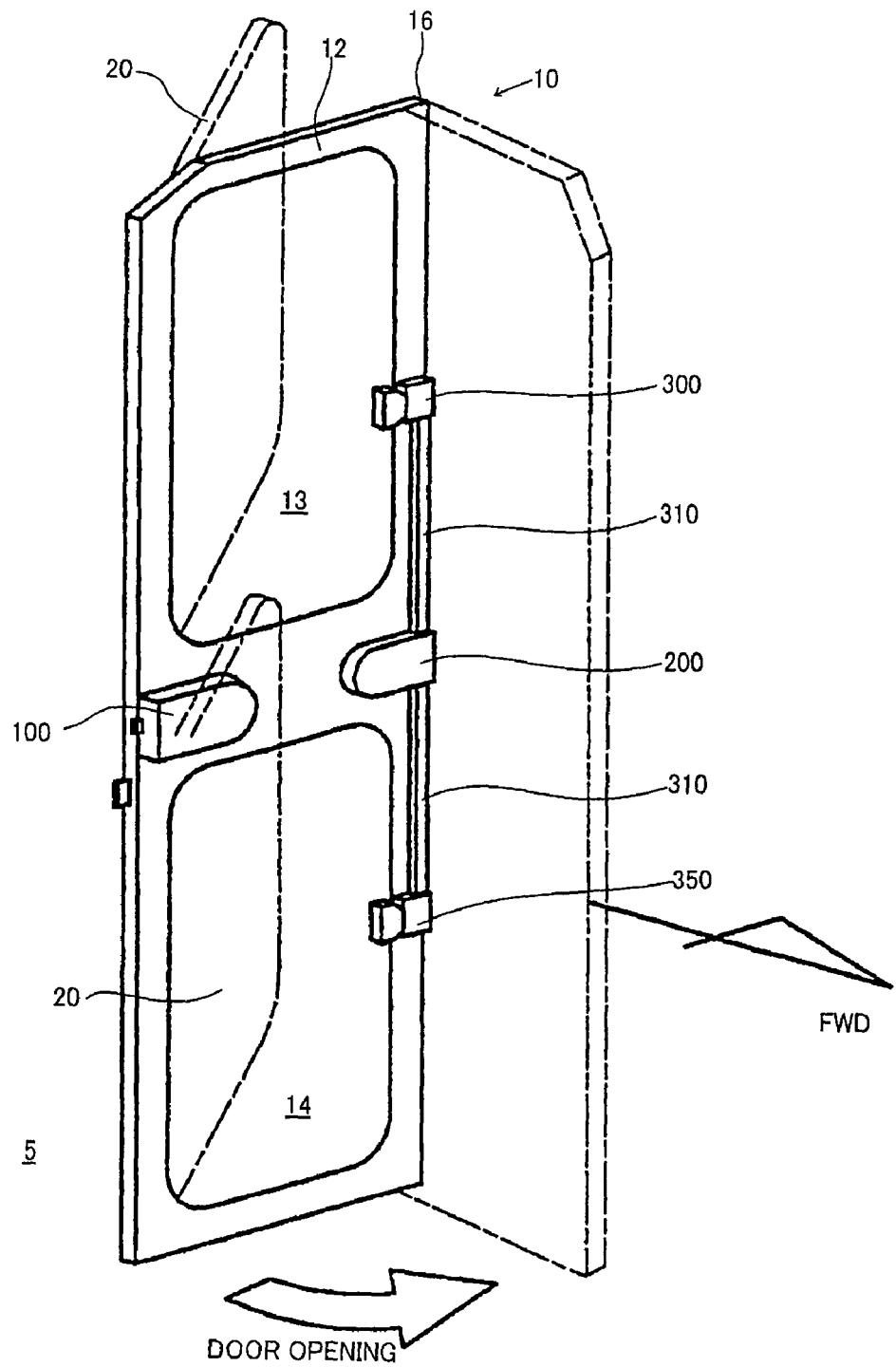
FIG. 2 is an outline view of the cockpit door to which the present invention is applied, seen from the cockpit side.
Figure 3:
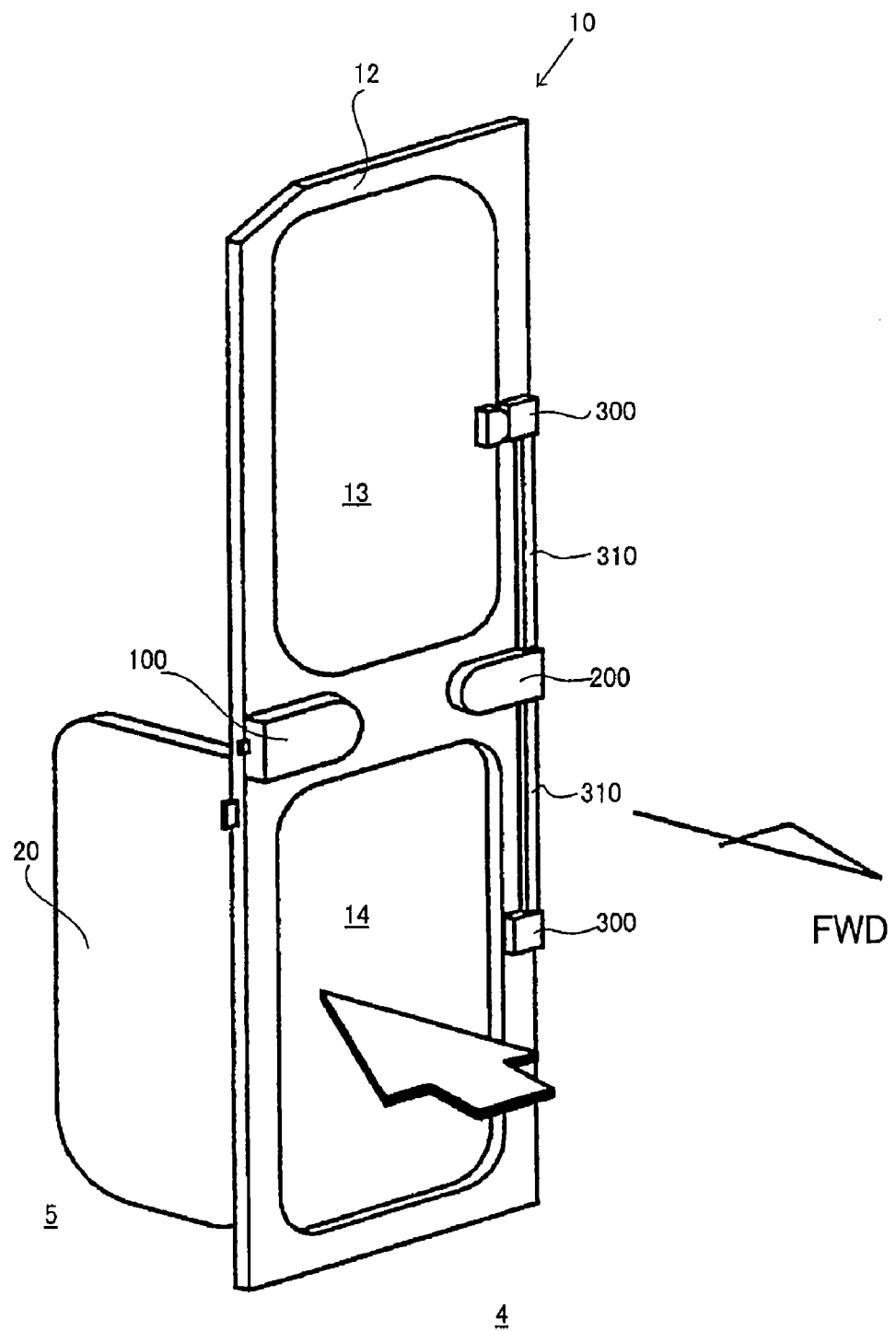
FIG. 3 is an outline view of the cockpit door to which the present invention is applied, seen from the cockpit side.

FIGS. 2 and 3 are outline views of a cockpit door 10 to which the present invention is applied, seen from a cockpit 4 side.

The cockpit door 10 is supported by a wall of a fuselage through a hinge 16 and is opened in an arrow direction shown in FIG. 2.

This cockpit door 10 is engaged with/disengaged from a catch by a main latch device 100.

This cockpit door 10 has two opening portions 13, 14 at a door body 12, and two escape doors 20 blocking the opening portions are mounted to the door body 12 through a hinge, not shown.

The two escape doors 20 are locked by an auxiliary latch device 200, and the auxiliary latch device 200 is provided with a function to open a catch 300 interlocking with the latch by a differential pressure and to open the escape door 20 toward the cabin side only when a rapid pressure reduction occurs on the cabin side.

Figure 4:
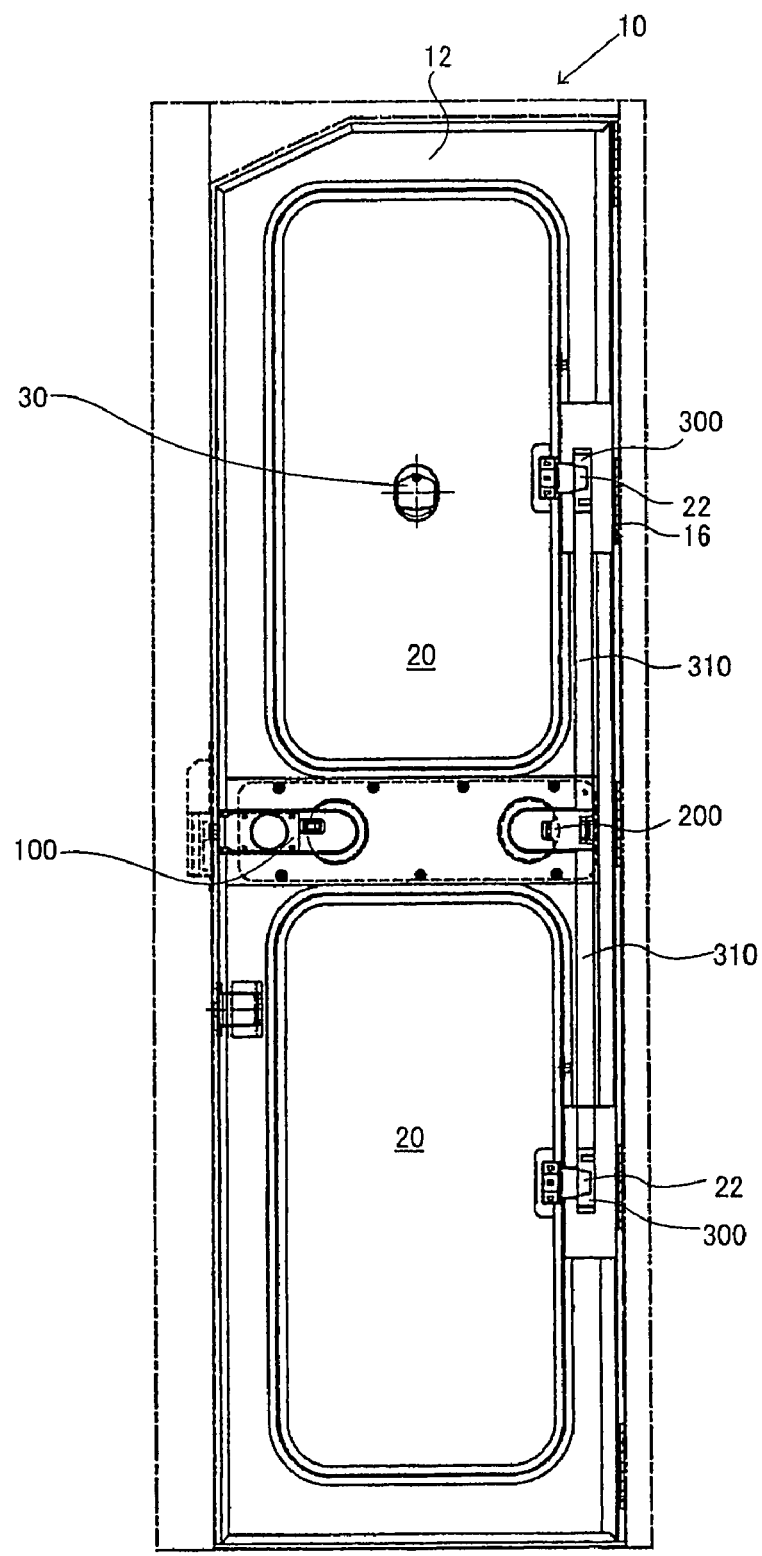
FIG. 4 is a front view of the cockpit door seen from the cockpit side.
Figure 5:
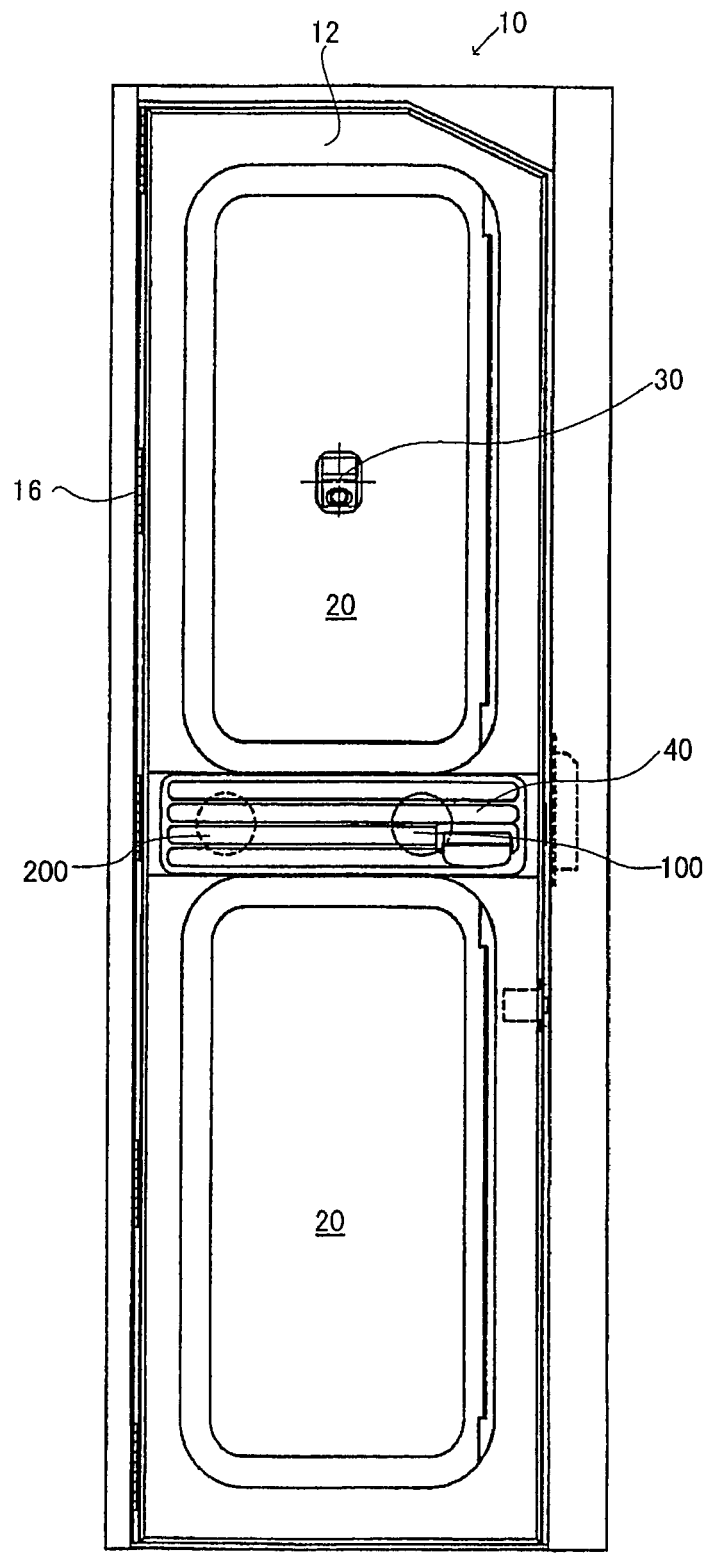
FIG. 5 is a front view of the cockpit door seen from the cabin side.

FIG. 4 is a front view of the cockpit door 10 seen from the cockpit side, and FIG. 5 is a front view of the cockpit door 10 seen from the cabin side.

A window 30 is provided for observing the cabin from the cockpit side, and the main latch 100 and the auxiliary latch device 200 provided with a pressure-sensing mechanism are covered by a cover 40 provided on the cabin side.

Figure 6:
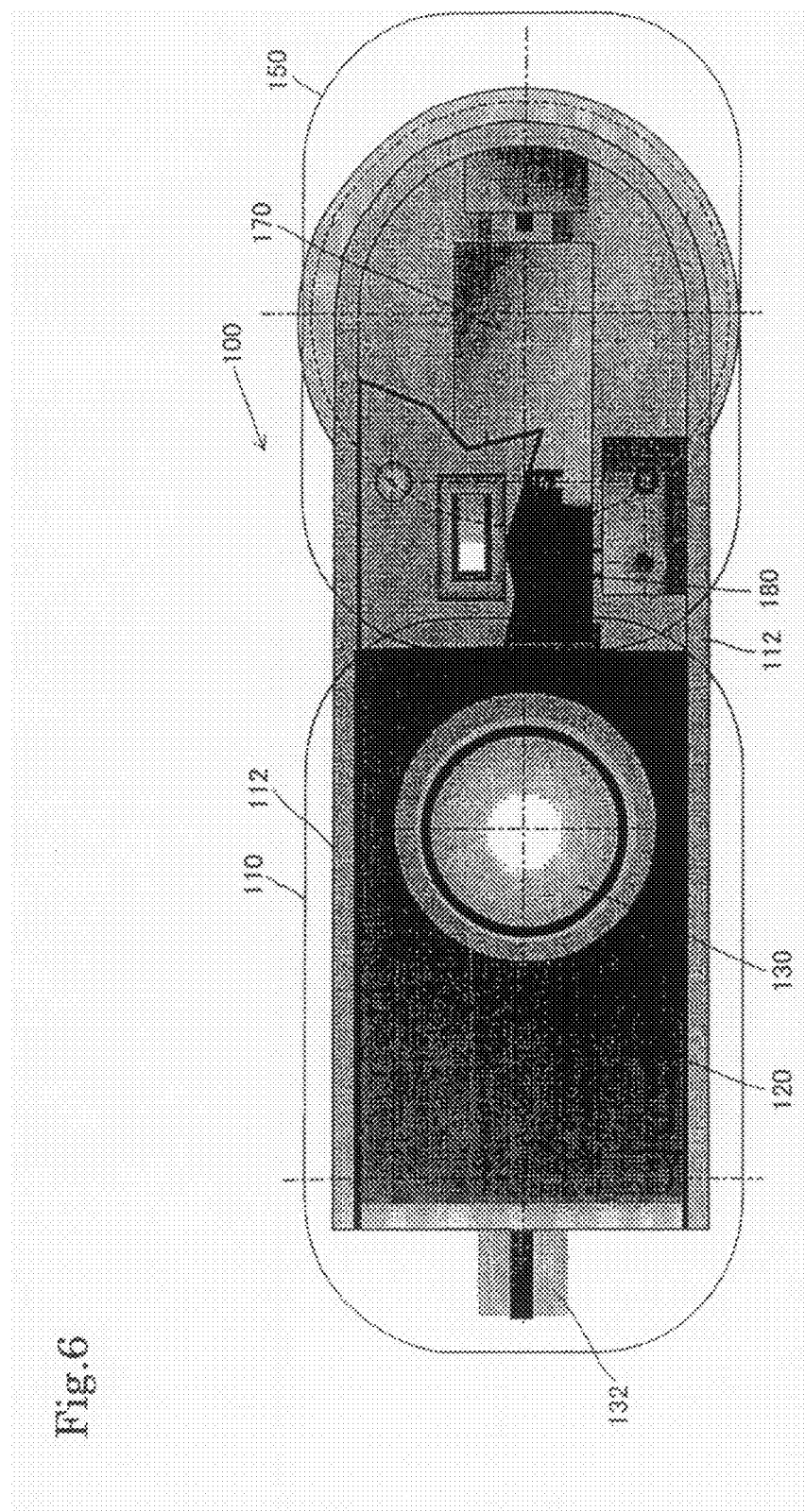
FIG. 6 is a front view of a main latch device seen from the cockpit side.
Figure 7:
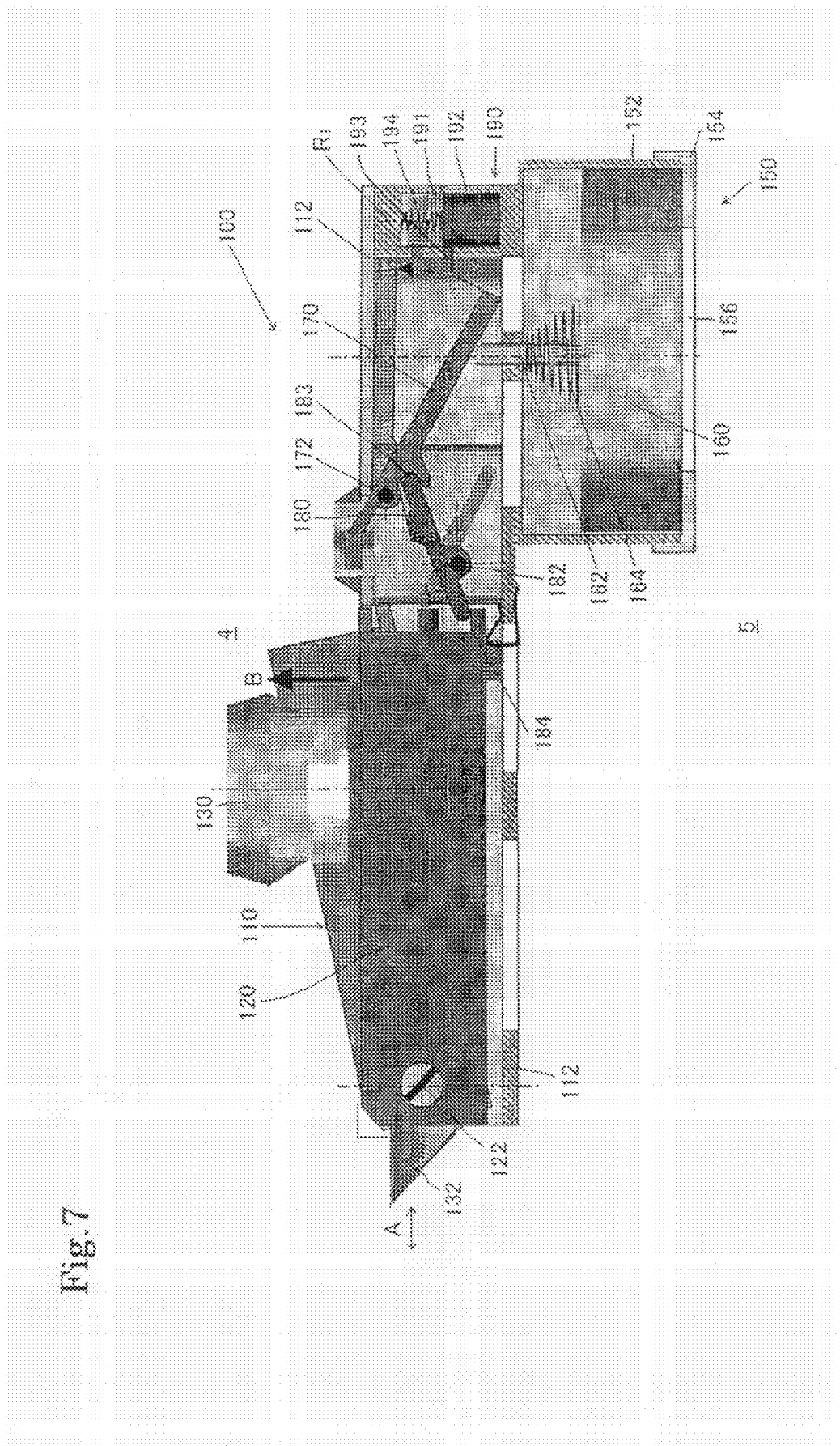
FIG. 7 is a sectional view of a main latch device seen from the cockpit side.

FIG. 6 is a front view of the main latch device 100 seen from the cockpit side, and the FIG. 7 is a sectional view thereof.

As shown in FIG. 6, the main latch device 100 is provided with two mechanisms of a latch portion 110 and a holding/releasing portion 150.

The latch portion 110 has a latch base 120 rotatably supported by a pin 122 with respect to a frame 112, and a door handle 130 is rotatably mounted at the latch base 120. By rotating the door handle 130, a bolt 132 is moved in an arrow A direction by a known mechanical mechanism. When the bolt 132 is moved forward, it is engaged with the catch provided on the wall side, and the cockpit door 10 is held at a closed position.

The holding/releasing portion 150 has a cylinder 152, into which a pressure-sensing piston 160 is slidably inserted. An opening end of the cylinder 152 is sealed by a cap 154, and the cap 154 has an opening portion 156 opened on the cabin 5 side. The tip end of a piston rod 162 of the pressure-sensing piston 160 penetrates the frame 112 and is brought into contact with a trigger 170.

The trigger 170 is pivotally rotated with a pin 172 as the fulcrum, and the trigger 170 is brought into contact with one end 183 of a flapper 180. The flapper 180 is supported by a pin 182 capable of pivotal rotation, and the other end 184 of the flapper 180 presses the rear end of the latch base 120.

Normally, the end 184 of the flapper 180 presses the rear end of the latch base 120, and the latch base 120 holds its attitude. Then, the latch portion 110 functions as a normal latch.

When a rapid pressure reduction occurs on the cockpit 4 side, the pressure-sensing piston 160 is pushed into the cockpit 4 side against a spring 164 by a differential pressure with the cabin 5 side. The piston rod 162 rotates the trigger 170 in an arrow $R_1$ direction, and the trigger 170 disengages the flapper 180.

By this action, the flapper 180 is rotated to release the rear end of the latch base 120. The latch base 120 is rotated in an arrow B direction around the pin 122. The bolt 132 is removed from the catch, and the cockpit door 10 is opened toward the cockpit 4 side.

The above mechanism and action are the same as disclosed in the Japanese Patent Laid-Open Publication No. 2003-261098.

When an impact is applied to the cockpit door 10 from the cabin 5 side, even if there is no differential pressure with the cockpit 4 side, the pressure-sensing piston 160 is pushed into by an inertia force and might release the latch base unexpectedly.

Then, in the latch device of the cockpit door of an aircraft of the present invention, a stopper device for regulating movement of the pressure-sensing piston 160 is provided.

A stopper device 190 is provided in the vicinity of the tip end of the trigger 170.

The stopper device 190 has a cylinder portion 191 and an inertia piston 192 slidably inserted into the cylinder portion 191. The inertia piston 192 has a pin 193 projecting on the trigger 170 side and is urged by a spring 194 toward the pressure-sensing piston 160 side all the time.

Figure 8:
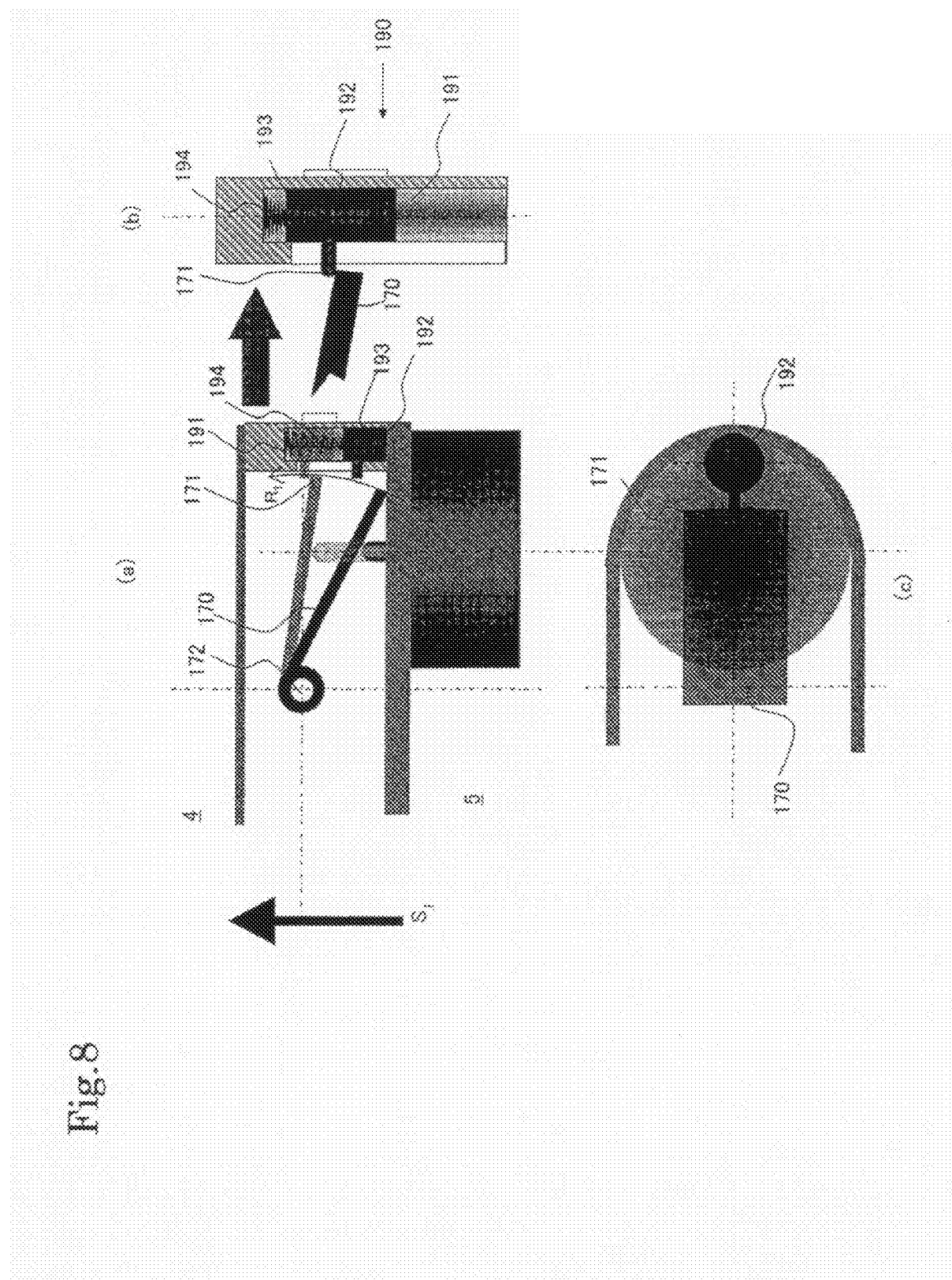
FIG. 8 is an explanatory view illustrating the detail and action of a construction of a stopper device.

FIG. 8 shows the detail and action of the construction of the stopper device 190.

Suppose that an impact force $S_1$ is applied to the cockpit door 10 from the cabin 5 side. By an inertia force generated by the impact force $S_1$, the pressure-sensing piston 160 is pushed into the cockpit 4 side, and the piston rod 162 is rotated in an arrow $R_1$ direction around the trigger 170.

At the same time, the inertia piston 192 of the stopper device 190 is moved toward the cockpit 4 side against the spring 194. Since the trigger 170 makes a pivotal motion, if the movement of the inertia piston 192 precedes the movement of the tip end 171 of the trigger 170, the pin 193 of the inertia piston 192 waits for the tip end 171 of the trigger 170 in at the stroke end and stops the pivotal rotation.

If the pivotal rotation of the trigger 170 is regulated, the end 183 of the flapper 180 keeps engaged with the trigger 170, and the flapper 180 maintains holding of the latch base 120.

By this action, unexpected opening of the cockpit door which receives an impact force from the cabin side is prevented.

Figure 9:
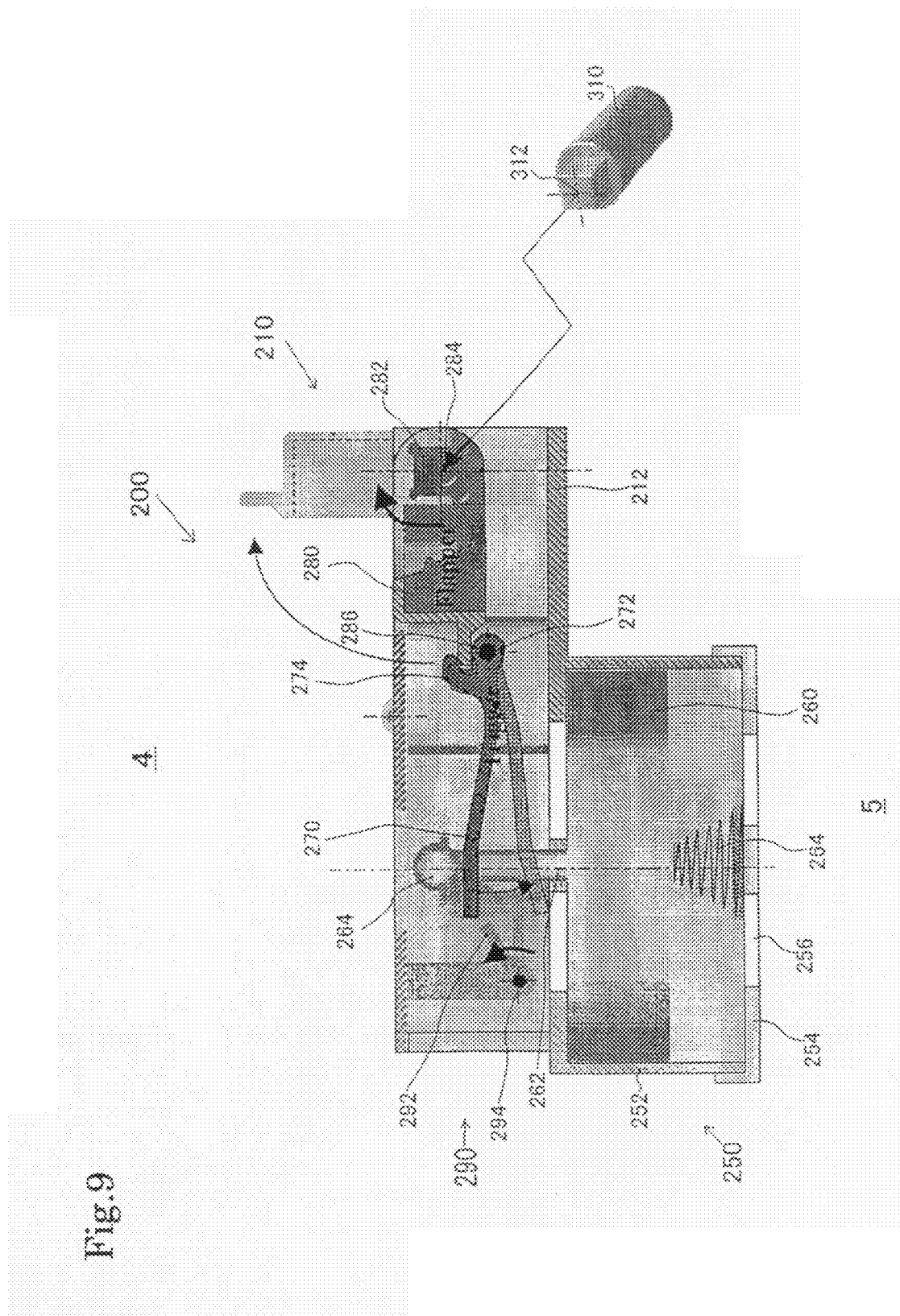
FIG. 9 is a sectional view of an auxiliary latch device which opens an escape door by sensing a pressure.
Figure 10:
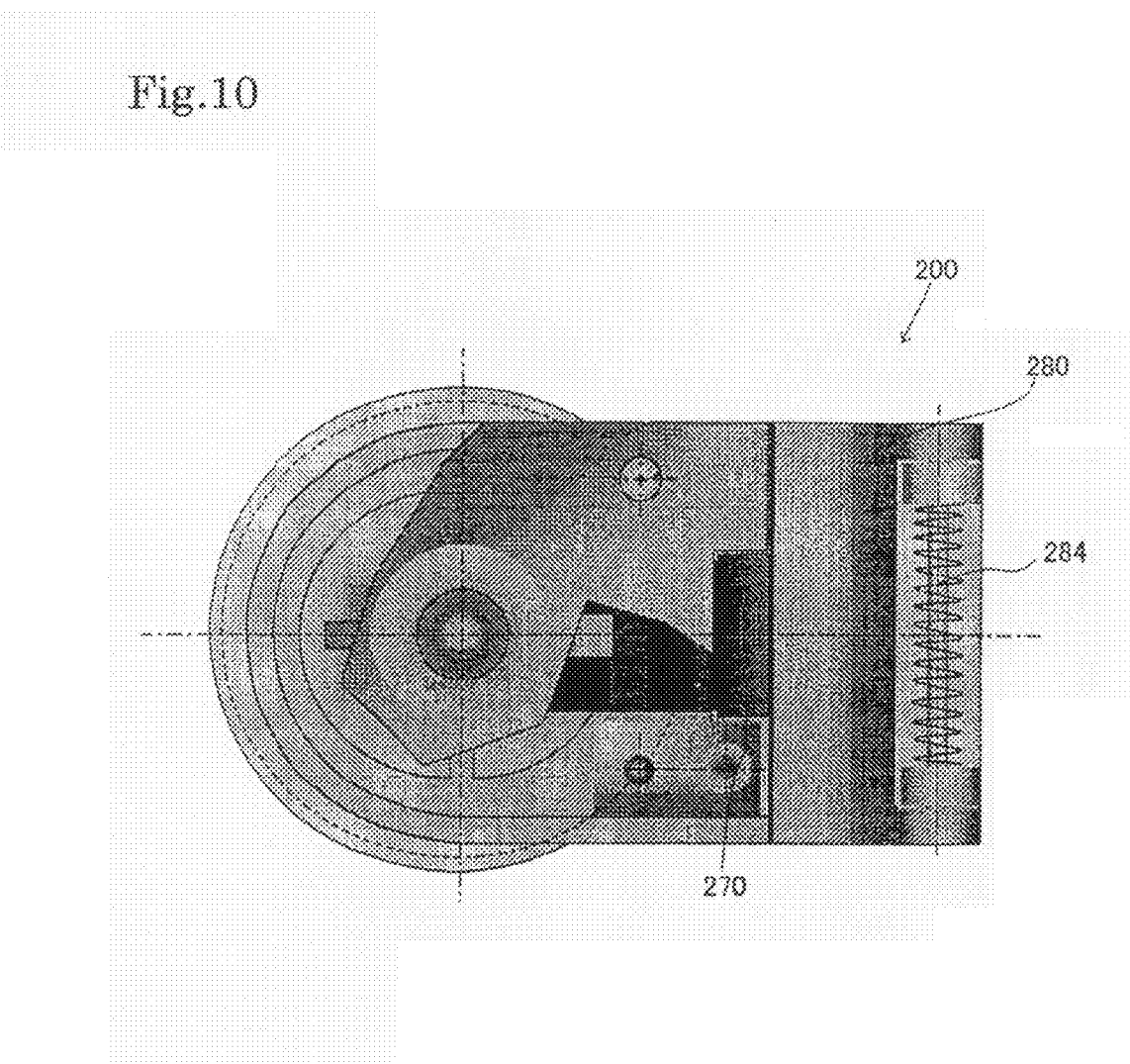
FIG. 10 is a front view of the auxiliary latch device which opens the escape door by sensing the pressure.

FIG. 9 is a sectional view of the auxiliary latch device 200 which opens the escape door 20 by sensing pressure, and FIG. 10 is a front view thereof.

The auxiliary latch device 200 has a latch portion 210 and a holding/releasing portion 250 as with the main latch device 100.

The latch portion 210 has a flapper 280 rotatably mounted in a frame 212 by a pin 284. The flapper 280 is normally held by engagement with a trigger 270, but when engagement with the trigger 270 is released, it is rotated by 90 degrees. This rotating force is transmitted to a torque tube 310 and works so as to remove the catch 300 holding the latch 22 of the escape door 20 from the latch 22.

The holding/releasing portion 250 has a pressure-sensing piston 260 slidably inserted into a cylinder 252, and an opening portion of the cylinder 252 is covered by a cover 254. The cover 254 is provided with an opening portion 256 opened toward the cabin 5 side.

A spring 264 is disposed between the cover 254 and the pressure-sensing piston 260 and urges the pressure-sensing piston 260 toward the cockpit 4 side all the time. A piston rod 262 of the pressure-sensing piston 260 penetrates a hole of the trigger 270 and has a spherical portion 264 at the tip end brought into contact with the trigger 270.

The trigger 270 is rotated around the pin 272, and a claw 274 formed in the vicinity of the pin 272 holds a projection 286 of the flapper 280.

If a rapid pressure reduction occurs on the cabin 5 side in this state, the pressure-sensing piston 260 is moved toward the cabin 5 side against the spring 264 by the differential pressure with the cockpit 4 side. The piston rod 262 draws the trigger 270, and the claw 274 of the trigger 270 is removed from the projection 286 of the flapper 280.

By this action, the torque tube 310 interlocking with the flapper 280 is rotated, and the catch 300 releases the latch 22 of the escape door 20. The escape door 20 is opened toward the cabin 5 side so that the crew in the cockpit can escape to the cabin side.

The auxiliary latch device 200 is provided with a stopper device which prevents unexpected movement of the pressure-sensing piston 260 due to an inertia force and unexpected operation of the holding/releasing portion when an impact force is applied to the cockpit door.

The stopper device 290 is provided with an arm 292 rotated around a pin 294.

Figure 11:
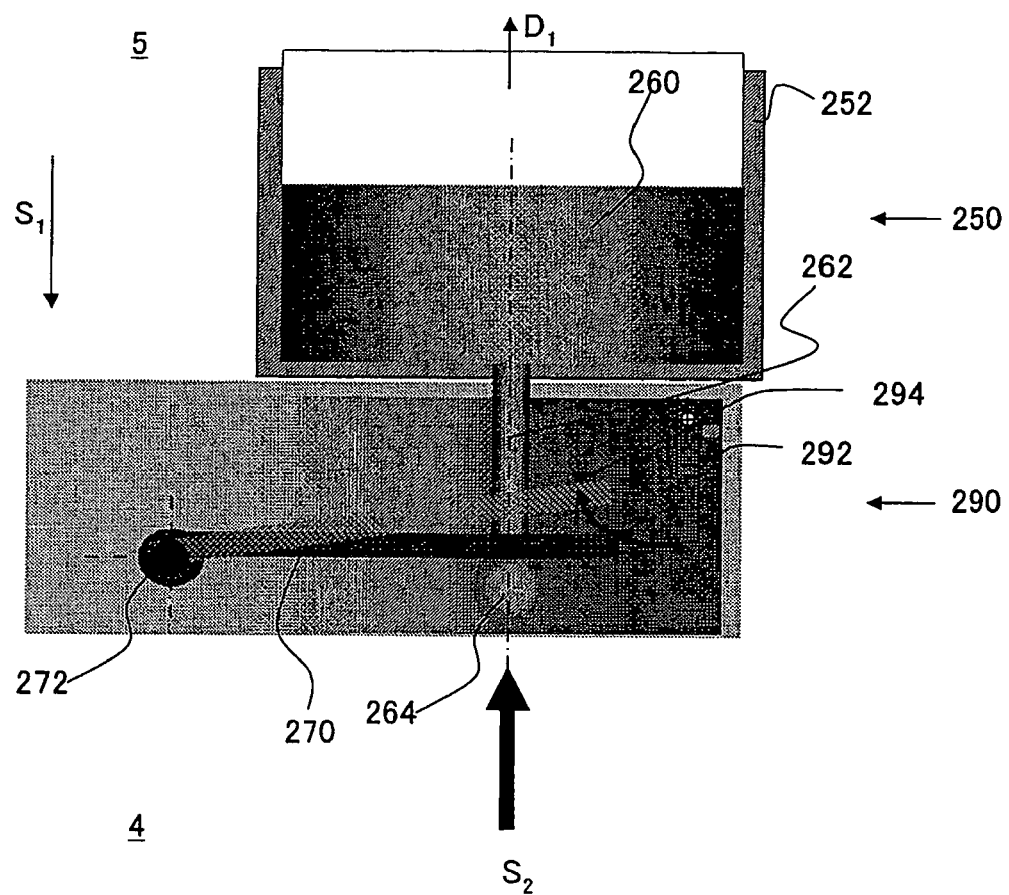
FIG. 11 is an explanatory view showing the construction and action of the stopper device.

FIG. 11 is an explanatory view illustrating the construction and action of the stopper device 290.

When the impact force $S_1$ acts on the cockpit door from the cabin 5 side, the pressure-sensing piston 260, upon receipt of the inertia force, is moved toward the cockpit 4 side. The movement of the pressure-sensing piston 260 does not give any influence on the holding/releasing portion 250.

On the contrary, if an impact force $S_2$ acts on the cockpit door from the cockpit 4 side, the pressure-sensing piston 260 is, as shown by an arrow $D_1$, moved toward the cabin 5 side by the inertia force.

The movement of the pressure-sensing piston 260 works as operation to open the escape door 20 even though an air pressure difference does not occur between the cockpit and the cabin.

Then, the unexpected movement of the pressure-sensing piston is regulated by the stopper device 290. The arm 292 of the stopper device 290 is rotated around the pin 294, and the tip end is set so as to interfere with the trigger 270 at a rotated position.

Then, along with the piston rod 262 of the pressure-sensing piston 260, it is configured that the arm 292 of the stopper device 290 is pivotally rotated and advances into the track drawn by the tip end of the trigger 270 prior to the pivotally rotating operation of the rigger 270 to a position to release the flapper. By this configuration, the pivotal rotation of the trigger 270 is stopped at a position before the trigger 270 releases the flapper 280, by which unexpected opening of the escape door 20 is prevented.

What is claimed is:

1. A latch device of a hinge-type cockpit door provided between a cabin and a cockpit of an aircraft and opened toward the cockpit side, said latch device comprising:
    a housing fixed to a door body;
    a latch base rotatably supported by a first pin with respect to the housing;
    a handle rotatably mounted to the latch base;
    a bolt interlocking with the handle;
    a flapper mounted to the housing, a first end of the flapper detachably engaged with the latch base;
    a trigger pivotably rotated with a second pin and detachably engaged with a second end of the flapper;
    a cylinder provided at the housing;
    a pressure-sensing piston located inside the cylinder, the piston having a tip end that penetrates the housing and contacts the trigger; and
    a holding/releasing mechanism for disengaging a stopper base by operation of the pressure-sensing piston moved when air pressure in the cockpit is lowered, wherein
    the holding/releasing mechanism comprises a stopper device for regulating movement of the trigger when an impact force is applied to the door body.

2. The latch device of a cockpit door of an aircraft according to claim 1, wherein the stopper device comprises:
    an inertia piston, wherein
    said inertia piston moves into a track of the trigger upon receipt of an inertia force by the impact force applied to the door body.

3. The latch device of a hinge-type cockpit door provided between a cabin and a cockpit of an aircraft and opened toward the cockpit side, in which
    a door body is provided with an escape door opened toward a cabin side and a latch device for holding the escape door, and the latch device is provided with a housing fixed to the door body, a cylinder provided at the housing, a pressure-sensing piston inserted into the cylinder, a trigger interlocking with the pressure-sensing piston, a flapper detachably engaged with the trigger, and a catch of a latch interlocking with the flapper;
    a holding/releasing mechanism is provided for releasing the catch by the operation of the pressure-sensing piston moved when the air pressure of the cabin is lowered; and
    the holding/releasing mechanism is provided with a stopper device for regulating movement of the trigger when an impact force is applied to the door body.

4. The latch device of a cockpit door of an aircraft according to claim 3, wherein the stopper device is provided with an arm precedingly advancing into a track of the trigger upon receipt of an inertia force by an impact force applied to the door body.

* * * * *